United States Patent [19]
Arzi et al.

[11] 3,898,789
[45] Aug. 12, 1975

[54] ELECTRIC CLOCK

[75] Inventors: Friedrich Arzi; Paul Hofert; Roland Sudler, all of Frankfurt, Germany

[73] Assignee: VDO Adolf Schindling AG, Frankfurt, Germany

[22] Filed: Feb. 22, 1974

[21] Appl. No.: 445,290

[30] Foreign Application Priority Data
Mar. 8, 1973 Germany............................ 2311445
Aug. 23, 1973 Germany............................ 2342544

[52] U.S. Cl................ 58/23 R; 58/23 D; 58/125 R; 58/126 R
[51] Int. Cl.................................................. G04c 3/00
[58] Field of Search .......... 58/53, 54, 55, 56, 23 R, 58/23 A, 23 BA, 23 D, 125 R, 126 R, 127 R; 310/156; 317/101 CC, 101 CP

[56] References Cited
UNITED STATES PATENTS
1,968,712  7/1934  Schonholtz et al................ 58/127 B
2,607,188  8/1952  Bourquin .......................... 58/126 R
3,256,453  6/1966  Haydon.............................. 310/156
3,375,384  3/1968  Thees................................ 310/156
3,461,663  8/1969  Albinger, Jr. et al. ........... 58/23 BA
3,469,132  9/1969  Haydon et al. ..................... 310/156
3,720,864  3/1973  Kolhagen......................... 310/156 X Primary Examiner—Joseph W. Hartary
Assistant Examiner—U. Weldon
Attorney, Agent, or Firm—Otto John Munz

[57] ABSTRACT

An electric clock with an electronic unit which generates a pulse train of constant frequency, and with a single-phase stepper motor to which this pulse train is fed comprising a stator with a field coil and $n$ poles arranged in one plane. The motor has an $m$ - pole permanent magnet armature. The elements of the hand mechanism are arranged between two plates.

7 Claims, 6 Drawing Figures

PATENTED AUG 12 1975　3,898,789
SHEET 2
FIG. 4
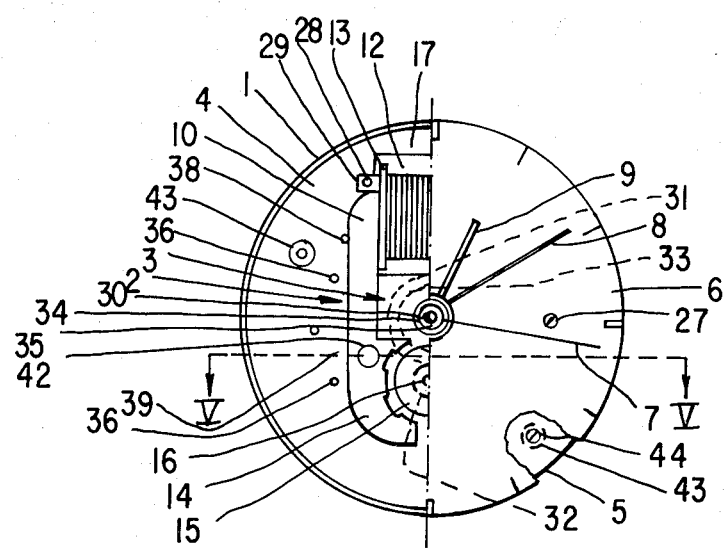
FIG. 5
FIG. 6
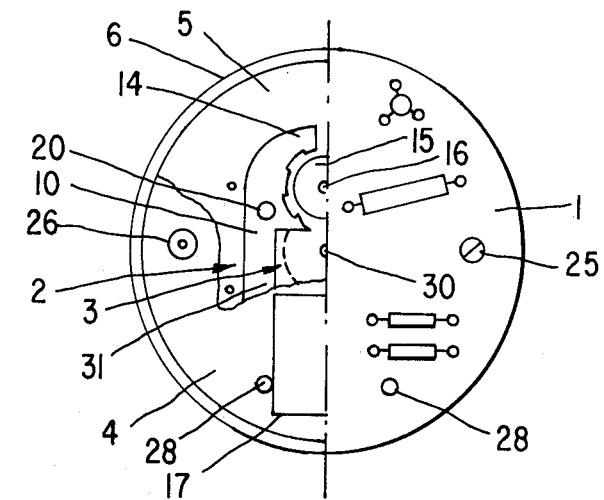

ELECTRIC CLOCK

BACKGROUND OF THE INVENTION

1. Field of the Invention

This invention relates to frames and cases for electric clocks as found in class 58 (Horology) subclasses 52 and 53+.

2. Description of the Prior Art

Electric clocks are known wherein the wheels of the hand mechanism are mounted in three superposed plates. A synchronous motor is fastened to the back side of a rear hand mechanism plate. A pulse train of constant frequency, perhaps 50 or 60 Hz, is fed to the synchronous motor. The electronic unit that generates the pulse train contains a quartz oscillator and a frequency divider mounted on a printed circuit plate. The printed circuit plate in turn is mounted, by way of spacing elements whose heights depend on the total height of the synchronous motor, on the back side of the rear hand mechanism plate. On the front side of a front hand mechanism plate, a dial face is fastened by means of two screws which are screwed into corresponding tapholes in the front plate. In another known electric clock of corresponding structure, only two superposed plates are provided to support the wheels of the hand mechanism. Clocks are also known which, while otherwise constructed in the same manner, instead of containing a synchronous motor, contain a single-phase stepper motor with a laminated stator, that has poles arranged in one plane, and a permanent magnet armature. In all these cases, the assembly is carried out in such a way that, after the hand mechanism has been completely assembled, the synchronous motor or the single-phase stepper motor is fastened, by means of two screws, to the corresponding plate, and then the printed circuit plate is mounted.

These known electric clocks have the disadvantage that their construction is expensive and that their volume is relatively large. In addition, their assembly is complicated and time consuming, and must be carried out by trained personnel.

SUMMARY OF THE INVENTION

The invention overcomes these disadvantages by production of an electric clock which contains as few structural elements as has been found possible, which has a small volume and which can be mounted rapidly and in a simple way. The clock can be such that a partially or fully automatic assembly of hand mechanism, motor, electronic unit, and dial is possible.

According to one embodiment of the invention, the stator of the single-phase stepper motor consists of at least two parts joined in a coil spool. Each of the two parts has at least one fastening hole. Both plates consist of plastic and are provided with molded-in bearings for the wheels and the armature shaft. At least one plate has a recess for the coil spool and a number of fastening holes corresponding to the number of fastening holes in the stator parts. Spacer pins are molded to at least one plate to support the other plate.

According to another embodiment of the invention, the stator of the single-phase stepper motor consists of two parts joined in a coil spool. Each of the two parts has at least one centering and one fastening hole. Both plates consist of plastic and, in addition to the bearings for the wheels, at least one plate has a recess for the casing-shaped coil. Both plates have a bearing for the armature shaft as well as a number of fastening holes corresponding to the number of fastening holes in the stator parts. Centering pins engaging the centering holes are molded to at least one plate. Spacer pins supported by the stator parts are molded to at least one plate. The two plates and the stator parts are held together by means of rivets, screws, or other fastening means, inserted in the fastening holes and openings.

By these devices of the invention the result is achieved that, in comparison with the known clocks, not only is a substantial diminution of the volume achieved, but also there is a decrease in the number of structural parts, such as fastening screws, plate spacers, separate bearings, and fastening and supporting means for the motor. Thereby and by the structure of the invention, the assembly is considerably simplified. In one embodiment, it may be carried out as follows: After inserting one of the two plates in an assembly support, the two stator parts joined in the coil spool are placed on the plate and fastened. The armature shaft and thereafter the individual shafts provided with the wheels are inserted in the corresponding bearings. Then the other plate is placed on top. Subsequently the two plates are connected, as by means of screws. In another embodiment, it may be carried out as follows: After inserting one of the two plates in an assembly support, the two stator parts joined in the coil spool are placed on the plate. The armature shaft and thereafter the individual shafts provided with the wheels are inserted in the corresponding bearings. Then the other plate is placed on top. Subsequently the two plates and the stator parts are connected, as by means of rivets.

This assembly can be carried out in an automatic machine without technical difficulties. The fastening of the electronic unit, that is, the printed circuit plate, as well as the fastening of the dial face in the hand mechanism and motor unit can, if desired, be carried out on the same or another automatic machine. Such a clock is less expensive than known clock constructions, particularly in assembly line production with the use of automatic machines.

A further reduction in manufacturing cost can be accomplished by making the stator parts of solid material or a sintered material. Sintered stator parts are generally preferable, since in the manufacture of such stator parts, the centering and fastening holes can be molded-in without additional operations. Stators with laminated structure can also be used. The stator parts can be fastened to the corresponding plate by means of screws or rivets. It has been found advantageous to substitute fastening pins molded into the plate in place of fastening holes for the stator parts. The stator parts are slipped onto these pins and are held by hot-forming of the pins.

In a clock with a structural unit that contains a printed circuit plate, it is possible by using plastic plates to fasten the printed circuit plate to the rear plate by way of range spacers, such as thin spacer discs, molded thereto. This not only further simplifies the assembly, but it also makes additional range spacers between plates superfluous. For the same reasons it proved practical to fasten the dial face directly to the front plate. The fastening of the dial face and the printed circuit plate can be carried out as usual, although self-tapping screws for this purpose have been found particularly advantageous for ease of manufacture.

Assembly can also be facilitated by molding a projection to the external surface of each flange of the casing-shaped coil in the stator plane. The projection contains a connecting element for the electric feed lines. The connecting element extends with both ends from the projection. Each connecting element is preferably shaped like a pin and protrudes with one end beyond the edges of the flange. The ends of the field coil in this structure are soldered to the short ends of the connecting element. The long ends which extend beyond the flange edges serve for connection to the printed circuit plate. The long ends, if their length is properly chosen, penetrate the corresponding holes in the printed circuit plate when the printed circuit plate is being fastened to the plate. After fastening of the printed circuit plate, the long ends need only be soldered to the printed conductors.

The position of the single-phase stepper motor on the plate can be freely chosen. However, it is preferred to arrange the single-phase stepper motor with the stator parts, the coil spool, and the permanent magnet armature on the plate or plates so as to enclose the second-hand shaft. This achieves an especially compact, space-saving structure. When only one fastening hole is present in each stator part, it is especially advisable, in order to fit the position of the stator parts precisely, to mold centering pins to at least one plate. These centering pins abut against the outer or inner periphery of the stator parts.

BRIEF DESCRIPTION OF THE DRAWINGS

FIG. 4 is a partially cut-away plan view of the front side of the clock in a second embodiment of the invention.

FIG. 5 is a sectional view of the clock of FIG. 4 along line II—II.

FIG. 6 is a partially cut-away plan view of the back side of the clock of FIG. 4.

DESCRIPTION OF THE PREFERRED EMBODIMENTS

Figure 1:
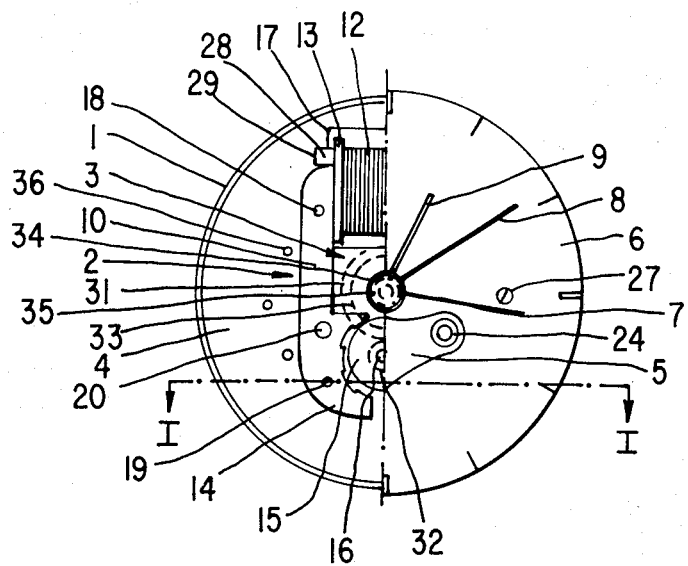
FIG. 1 is a partially cut-away plan view of the front side of the clock in one embodiment of the invention.
Figure 2:
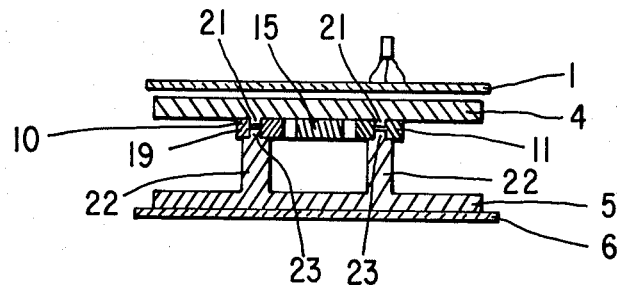
FIG. 2 is a sectional view of the clock of FIG. 1 along line I—I.
Figure 3:
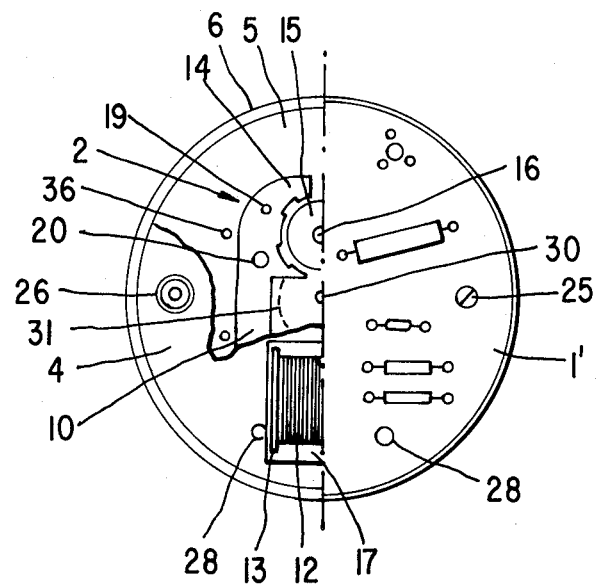
FIG. 3 is a partially cut-away plan view of the back side of the clock of FIG. 1.

As shown in FIGS. 1 to 3, the first embodiment of the clock comprises an electronic unit constructed on a printed circuit plate 1. The electronic unit generates a pulse train of a preferred frequency of 1 Hz. The pulse train is fed to a single-phase stepper motor 2. A hand mechanism 3 is provided with wheels supported by two circular plastic plates 4 and 5, which are superposed to each other in a spaced-apart manner. A dial face 6 is fastened on the front side of plate 5. In front of dial face 6, a second hand 7, a minute hand 8, and an hour hand 9 rotate.

The single-phase stepper motor 2 consists of two essentially equal stator parts 10 and 11 which are joined in a coil spool 13 supporting a field coil 12. At those ends which face away from coil spool 13, stator parts 10 and 11 each change over into a unipolar or multipolar shoe 14. Between the two pole shoes 14 there is a bipolar or multipolar permanent magnet armature 15 whose shaft 16 is supported by the two plates 4 and 5. The stator parts of motor 2 rest directly on plate 4, in which structure the protruding portions of coil spool 13 project into a recess 17 in plate 4. For fixing the position of stator parts 10 and 11, the latter are each provided with two centering holes 18 and 19. Moreover, each stator part 10 and 11 has a fastening hole 20.

As shown especially in FIG. 2, four centering pins 21 are molded to plate 4. The centering pins engage the corresponding centering holes 18 and 19 of the two stator parts. The height of centering pins 21 is smaller than the thickness of stator parts 10 and 11, which consist of solid material. Plate 5 is provided with four spacer pins 22 whose free ends each change over to a centering spindle 23. Centering spindles 23 each engage corresponding holes 18 and 19 from the other stator side. Plates 4 and 5 each have two fastening holes aligned with fastening holes 20. A tubular rivet 24 projects through each of these centering holes. Stator parts 10 and 11 and the two plates 4 and 5, are immovably held together by the two tubular rivets 24.

Printed circuit plate 1, which contains the electronic parts of the clock, is fastened to the back side of plate 4 by means of two self-tapping screws 25. Printed circuit plate 1 rests on two thin spacer discs 26 molded to plate 4. Dial 6 face is arranged on the front side of plate 5. The dial may be pasted to plate 5 or fastened by means of self-tapping screws 27.

The electric connection of printed circuit plate 1 and field coil 12 on coil spool 13 takes place by means of two pin-shaped connecting elements 28. Each connecting element 28 is mounted in a projection 29 which is molded to the external surface of the coil flange in the stator plane. One of the ends of the connecting element is connected to a coil end. The other end of each connecting element 28 extends beyond the flange edges and ends in a corresponding hole in the printed circuit plate 1, where it is soldered to a printed conductor.

As shown, the arrangement of the single-phase stepper motor 2 between the two plates 4 and 5 is chosen in such a way that stator parts 10 and 11, coil spool 13, and permanent magnet armature 15 enclose the second hand shaft, thereby achieving an especially space-saving structure.

Second-hand shaft 30 is driven by permanent magnet armature 15, by way of a change gear gearwheel 31, and a pinion 32. For driving the minute wheel 33 on tubular minute-hand shaft 34, which is supported by gearwheel 31, and for driving the tubular hour-hand shaft 35, which is supported by shaft 34 and in plate 5, further gearwheels and pinions, not shown in detail, are provided with their shafts supported at points 36 of plates 4 and 5.

FIGS. 4, 5 and 6 correspond in many respects to FIGS. 1, 2 and 3, and corresponding numbers are used to indicate corresponding elements. Certain differences are now described.

For fixing the position of stator parts 10 and 11, two centering pins 38 and 39 are molded to plate 4 on each of the two sides of the stator in place of the centering holes of the previous embodiment. These pins abut against the outer periphery of stator parts 10 and 11, respectively. Each stator part 10 and 11 is provided with a fastening hole 20 through which a fastening pin 41 molded to plate 4 extends in place of the rivets of the previous embodiment. The free end 42 of pin 41 is hot-molded to fasten it. Two spacer pins 43 are also molded to plate 4. Plate 5 is fastened on these spacer pins by means of two countersunk screws 44.

As will be seen, FIG. 6 is shown for completeness only, and it is quite similar to FIG. 3.

We claim:

1. In an electric clock including a plurality of wheels on spindles, a hand mechanism whose elements are arranged between two plastic plates, an electronic unit for generating a pulse train of constant frequency, and a single phase stepping motor with a permanent-magnet armature responsive to the pulse train, the motor comprising an armature shaft, a stator with a field coil, and a permanent magnet armature, the improvement comprising:

A. a field coil on a coil spool,
   B. the stator comprising at least two parts joined to the coil spool, each of said parts being provided with at least one fastening element,
   C. bearings molded in the two plastic plates for the wheel spindles and armature shaft,
   D. a recess in at least one of the two plastic plates for the field coil on its spool,
   E. a plurality of correspondingly positioned fastening elements in at least one plate corresponding to the fastening elements in the stator parts, including fastening means for connecting the corresponding fastening elements,
   F. spacer means molded into at least one plate to support the other plate,
   G. a dial face secured to a front one of the two plastic plates,
   H. a printed circuit plate bearing the electronic unit, and
   I. range spacer means molded to a rear one of the two plastic plates for fastening the printed circuit plate on a side of the rear one of the two plastic plates away from the front one of the two plastic plates and in a spaced relationship with the rear one of the two plates.

2. A clock according to claim 1 further comprising self-tapping screw means for fastening the dial and the printed circuit plate respectively to the front and back plastic plates.

3. A clock according to claim 1 further comprising a projection molded to an external surface of each of two flanges of the coil spool, and a connecting element in each projection for electric feed lines to the coil.

4. A clock according to claim 3 wherein each connecting element is pin-shaped and extends beyond the edges of the flange.

5. A clock according to claim 1 wherein the stepping motor, the two parts of the stator, the coil spool and the permanent-magnet are arranged in the two plastic plates so as to surround a second-hand shaft in the hand mechanism.

6. A clock according to claim 5 further comprising centering pins molded to one plate for abutting the periphery of the stator parts to place the parts properly.

7. A clock according to claim 1 wherein each stator part includes one centering hole, and one of the plates includes centering pins molded thereto for engaging the centering holes.

* * * * *

UNITED STATES PATENT OFFICE
CERTIFICATE OF CORRECTION

Patent No. 3,898,789    Dated August 12, 1975

Inventor(s) Friedrich Arzt

It is certified that error appears in the above-identified patent and that said Letters Patent are hereby corrected as shown below:

On the Cover Sheet, in item [75] "Friedrich Arzi" should read -- Friedrich Arzt --.

Signed and Sealed this twenty-first Day of October 1975

[SEAL]

Attest:

RUTH C. MASON
*Attesting Officer*

C. MARSHALL DANN
*Commissioner of Patents and Trademarks*